United States Patent [19]

Gancarz, Sr.

[11] 4,119,136
[45] Oct. 10, 1978

[54] METHOD OF RECOVERING TIN FROM TIN DROSS

[76] Inventor: Robert Martin Gancarz, Sr., 98 Szetela Dr., Chicopee, Mass. 01021

[21] Appl. No.: 844,809

[22] Filed: Oct. 25, 1977

[51] Int. Cl.² .............................................. B22D 0/00
[52] U.S. Cl. ........................................ 164/121; 75/24; 75/64; 164/129; 164/134; 249/105; 249/130
[58] Field of Search ............... 164/121, 129, 134, 258, 164/335, 338; 75/24, 63, 64; 266/227, 232; 249/130

[56] References Cited

U.S. PATENT DOCUMENTS

| 404,381 | 6/1889 | Clark | 249/130 X |
| 814,334 | 3/1906 | Taliaferro | 75/64 |
| 4,075,008 | 2/1978 | Leonard | 75/24 X |

FOREIGN PATENT DOCUMENTS 681,810  3/1964  Canada .................................... 164/258

Primary Examiner—Robert D. Baldwin
Attorney, Agent, or Firm—Ross, Ross & Flavin

[57] ABSTRACT

A method of recovering tin from tin dross consisting of positioning a barrel having an apertured bottom and charged with a supply of the tin dross upon a partitioned collecting tin mold, with the components thus arranged being placed into a furnace for subjecting the components and tin dross charge to a temperature approximating 700° F for a time duration approximating 5 − 6 hours and allowing the developed molten free tin to flow downwardly of the barrel and through the apertures thereof and into and between the partitions of the collecting tin mold, and withdrawing the collecting tin mold for cooling before removing the cast tin bars therefrom. The apparatus aspect relates to the design of the barrel and collecting tin mold.

1 Claim, 5 Drawing Figures

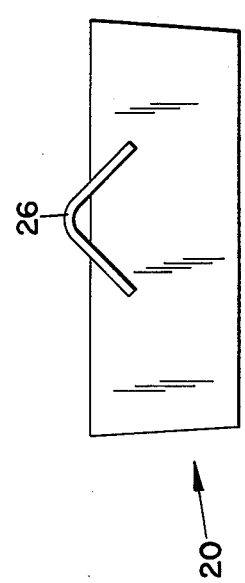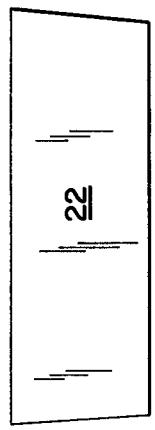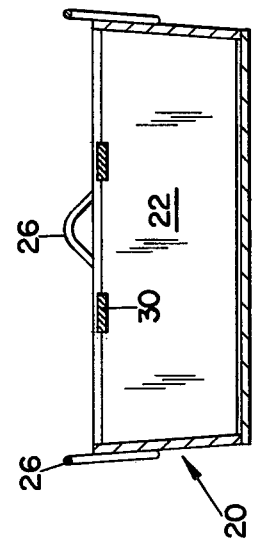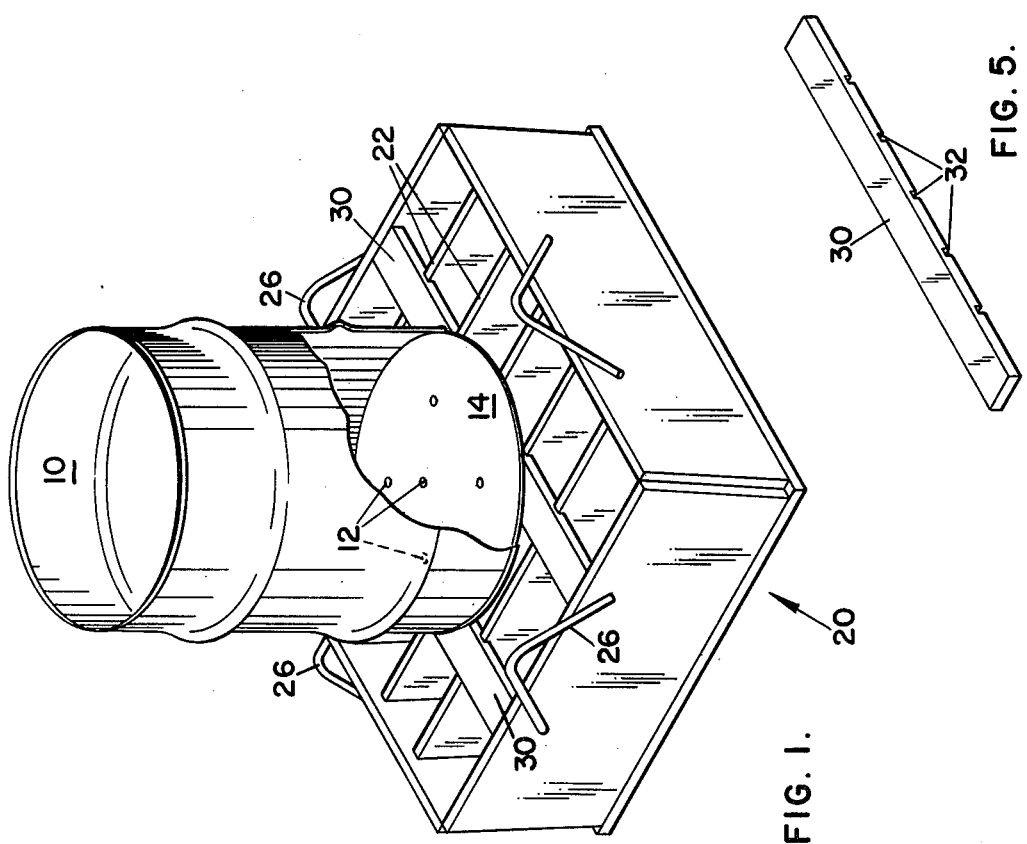

METHOD OF RECOVERING TIN FROM TIN DROSS

My invention relates to a new and novel method of recovering tin from tin dross and an apparatus for performing the method, the desideratum in a facility conducting manufacturing operations where tin dross is generated being to reduce the totality of its tin consumption through a recycling of all recovered tin back to those operations demanding a tin supply.

The invention particularly comprehends usefulness in manufacturing facilities where copper products may be tin plated as by the hot dip method since such plating processes generate tin dross having high tin count and the tin thus represented must be recovered for obvious reasons of economy. In practically any tinning operation, the residue formed contains a quantity of tin and this is what is commonly termed tin dross.

Over the years, tin platers have experimented with a variety of methods for the avowed purpose of holding down tin consumption, methods which for the most part have only demonstrated impracticality and inefficiency. Such methods as have been generally known and accepted in the trade have been identified as creating more problems than they solved and as causing more expense in the recovery program than could be represented in the dollar value of any recovered tin.

The process of the invention is adapted with equal force and effect for the recovery of tin from tin dross enriched with iron, it being acknowledged that tin dross enriched with copper and tin dross enriched with iron exhibit substantially similar physical properties as a comparison of the tin-copper and tin-iron phase diagrams will attest.

Conventionally, in a tinning operation, the inevitable residue is collected at the so-called tinning bath and subsequently transferred to scrap barrels for eventual sale as tin dross to a scrap dealer.

The tin dross, in most cases, is comprised of what is referred to as powdered dross and tin oxide, same representing first, skimmings from the tinning bath surface, the tinning bath being constituted by selected proportions of tin, chlorides from flux residues and compounds of tin/iron or tin/copper, as the case may be, and second, such sludge as may be periodically scraped from the lower regions of the tinning bath when and as a purifying program is carried out, it being well recognized that any tinning bath not so regularly purified becomes deleteriously contaminated with tin/iron or tin/copper compounds.

In the drawings:

FIG. 1 is a perspective view of the tin dross barrel and collecting tin mold in operational relationship;

FIG. 2 is a side elevational view of the collecting tin mold;

FIG. 3 is a side elevational view of one of the partitions of the collecting tin mold;

FIG. 4 is a sectional view through the collecting tin mold; and

FIG. 5 is a perspective view of one of the positioning bars used to aid in supporting the partitions in vertical position.

According to the invention, the only components dictated for its practice are first, a metal barrel 10 having a plurality of apertures 12, each preferentially approximating 3/16 inch in diameter, drilled through the barrel bottom 14, which barrel is used for the collection therein of the tin dross as the tin plating program ensues, second, a collecting tin mold 20 of a size entirely capable of supporting barrel 10 upwardly of a plurality of spaced vertical plates 22 so that any tin leaking from the barrel will flow into and within the confines of the mold, and third, an annealing furnace capable of accommodating the collecting tin mold and the barrel upwardly thereof.

A pair of positioning bars 30 each provided with notches 32 on the bottom face thereof serve to position the vertical plates 22 in space and relationship as to each other.

The side and end walls of the collecting tin mold may be provided with handles for facilitating the manipulation thereof.

It is to be borne in mind that if barrel 10 is of 30 gallon capacity, the tin dross contained therein may weight as much as 1200# and if the mold is of a size 24 inches × 24 inches, the spacing between walls and partitions may be about 4 inches, it being important when considering that the cast bar of tin formed in each defined cavity may weight something in the area of 75–100#. For obvious practical reasons, to make the cavities any larger is to allow production of only larger and heavier bars.

Operationally, the filled barrel is first placed upon the vertical plates of the tin collecting mold and barrel and mold are then charged into the annealing furnace, preferentially of gas-fired type, where they are subjected to a temperature within the 700° F range for a time cycle approximating between 5 and 6 hours.

During the ensuing melting program, molten free tin is developed from within the tin dross and, being free, drips gradually and descendingly toward the barrel bottom, same finding its way through the apertures so as to drip into the collecting tin mold.

The copper or iron enriched alloy phase maintains a solid state, becoming only paste-like in texture at most, so as to preclude the flow thereof through the barrel apertures. Rather, it forms as a mat upon the barrel bottom while the co-called lighter dust and metallic oxides rise to the surface of the developing mass within the barrel, the separation of the oxides being the result of the recognized differences in specific gravity. The mat represents a totally saturated compound which, while exhibiting an incapacity for retaining any additional melted free tin beyond its own limits, nonetheless fortunately allows the flow of the bulk of the free tin therethrough so as it reaches the apertures and drips therethrough into the mold therebeneath.

The collecting tin mold receives the molten tin, same seeking its own level in the various defined compartments as the tin flows under and around the partitions.

The side and end walls are preferentially formed about 5° off from defining straight sides relative to the base.

The vertical steel plates or partitions 22 are likewise provided with a slight 5° angle at their end edges. Desirably, the plates rest upon the bottom of the mold but the resultant relationship between plates and mold bottom and side and end walls exploits the inevitableness of the facts that all walls and edges will be formed with less than perfectly straight edges and that the mold bottom and walls will each offer a certain amount of warpage. Therebecause, myriad small spaces are provided in the noncontacting areas between the bottoms of the plates and the mold bottom and walls. Such spaces will usually be in the area of no more than several thousandths of an inch in height. Such a space is shown at 50 in FIG. 4.

As an advantageous result, each compartment or cavity defined between mold walls and plates is less than liquid tight wherefore the molten tin, being exceedingly fluent, flows under and around the plates, seeking its own level in known manner and filling all cavities evenly.

As aforesaid, when a sufficiently high temperature value has been attained in the furnace, the molten tin commences to drip through the barrel apertures, the mold by this time being sufficiently heated so as to allow the tin to remain in its molten state and to allow it to flow.

Experimentation has proven that the salient key is that the dripping tin must be captured in a mold heated to the same temperature as the dross barrel.

Undeniably, and tests have amply demonstrated that were the molten tin dripped into a cold mold, or a mold of a temperature less than the barrel temperature, tin solidification is threatened and unwanted pile buildup is almost a certainty.

At the termination of the heating program, the mold and barrel are removed from the furnace and allowed to cool, at which time the tin bars defined between the mold walls and plates are removed from the mold by the simple expedient of inverting the mold and allowing the bars to fall downwardly with the plates falling away from the tin bars as they are pulled away, ready for reuse in any tinning operation.

As earlier suggested, different tinning operations produce tin dross containing differing quantities of tin.

In the development of this invention, various charges of tin dross experimented with offered a tin content of between 83% and 86%.

Following tests using the process of this invention, the tin content in the various charges of processed dross averaged approximately 70%.

The average tin charge recovered from this process proved to be approximately 98% pure with a balance of copper or iron as the case may be.

When and if the furnace is operated at a temperature of lower than 700° F, tin more pure than 98% can be obtained therefrom. In essence, the lower the temperature, the more pure the resultant tin.

By weight, the process yielded an average 48% recovery of 98% pure tin, signifying unquestionably that the process offered a capacity for producing, for example, 480 pounds of 98% pure tin from a barrel of tin dross weighing in, before processing, at 1000 pounds and had an average tin content of about 85%.

As long as the purity of the recovered tin is equal to or better than the purity of the liquid phase in the tinning bath, the process will remain well under control. The recovered tin even though it is 98% pure, will perform as well as pure tin in the tinning bath.

Actual experiments have proven this out. During development work, samples of tin taken from the liquid phase of 700° F tinning baths averaged out to be 95% to 96% pure. The recovered, 98% pure tin, was used quite extensively in the 700° F tinning baths for tin plating copper wire with no adverse affects on the brightness or smoothness of the tin coatings. Also, tin-copper sludge build-up in the bottom of the tinning baths was inmeasurable over several months of operating time.

I claim:

1. The process of recovering tin from tin dross consisting of the steps of:

charging the tin dross in a metal barrel provided with apertures through its bottom, positioning the barrel on a partitioned steel mold with spacings between the partitions and mold walls, charging the barrel and mold combination into an annealing furnace maintained at an operating temperature of approximately 700° F for a time interval of between 5 and 6 hours, allowing the generated molten tin to drop downwardly of the barrel and through the apertures thereof into the mold, removing the barrel and mold from the furnace and cooling same prior to separation of mold and ingots of solidified tin.

* * * * *